United States Patent [19]

Muschelweicz et al.

[11] Patent Number: 5,672,428
[45] Date of Patent: Sep. 30, 1997

US005672428A

[54] SILICONE RELEASE COATED POLYESTER FILM AND A PROCESS FOR COATING THE FILM

[75] Inventors: Kenneth J. Muschelweicz, Easley; Robert G. Posey, Taylors, both of S.C.

[73] Assignee: Hoechst Celanese Corporation, Somerville, N.J.

[21] Appl. No.: 544,246

[22] Filed: Oct. 17, 1995

[51] Int. Cl.$^6$ ........................................................ B32B 7/12
[52] U.S. Cl. ........................... 428/352; 428/447; 428/483; 106/287.13; 106/287.14
[58] Field of Search .................................. 428/352, 40.1, 428/41.4, 447, 452, 480, 483; 106/287.13, 287.14, 287.1

[56] References Cited

U.S. PATENT DOCUMENTS

| | | |
|---|---|---|
| 3,427,270 | 2/1969 | Northrup . |
| 3,928,690 | 12/1975 | Settineri et al. . |
| 4,822,687 | 4/1989 | Kessel et al. . |
| 4,851,166 | 7/1989 | Kendall . |
| 5,298,325 | 3/1994 | Culbertson ........................... 428/352 X |
| 5,529,822 | 6/1996 | Togashi et al. ........................... 428/352 |

FOREIGN PATENT DOCUMENTS

| | | |
|---|---|---|
| 1120176 | 1/1977 | Canada . |
| 0 536 766 A2 | 4/1993 | European Pat. Off. . |
| 1 541 801 | 7/1979 | Germany . |

*Primary Examiner*—Daniel Zirker
*Attorney, Agent, or Firm*—Gregory N. Clements; Philip P. McCann

[57] ABSTRACT

A silicone release polyester film coated with an aqueous silicone coating composition on one surface. The aqueous silicone release coating composition is made up of an alkylvinylpolysiloxane containing vinyl groups, a tin or platinum catalyst, a glycidoxysilane and an alkylhydrogenpolysiloxane. A process for coating a polyester film with the aqueous silicone coating composition is also disclosed, where the coating occurs in-line, disclosing the manufacturing process for the film before it is heat-set. The silicone release coated polyester film has an acceptable release value when subjected to solvents or heat.

22 Claims, No Drawings

SILICONE RELEASE COATED POLYESTER FILM AND A PROCESS FOR COATING THE FILM

BACKGROUND OF THE INVENTION

1) Field of the Invention

The present invention concerns polyester release films which are particularly used as a temporary support substrate for an adhesive coated article. Examples of such are adhesive labels, adhesive shelf paper, removable lidding for microwavable food containers, and peel-off label stickers. In particular, the present invention relates to a temporary substrate made of polyester which has been coated with a silicone release coating composition. A process for coating a polyester film with the silicone release coating composition is also disclosed.

2) Prior Art

Polyester film is generally made by extruding an amorphous melt of polyester onto a polished casting drum which is cooled to solidify the melt into sheet form. The sheet then undergoes a stretching operation which aids in crystallizing the film, thus giving it strength and other physical properties. After the film has been stretched in one or two directions, the film is generally heat-set at a temperature higher than the temperature at which it is stretched. Heat setting serves to lock-in the properties of the polyester.

It is known to both off-line and in-line coat polyester film. Off-line coating occurs when the film is coated after the heat-setting stage and usually not by the polyester film manufacture. In-line coating is done during the polyester film manufacturing stage, typically after longitudinal stretching, and before heat-setting the film. The film may be coated by any well known techniques including gravure roller coating, spray coating, myer rod coating, slot coating or immersion coating. The coated film is then stretched traversely and then heat set.

Silicone coated release substrates are known, particularly in applications where the substrate is paper. It is important that the silicone coated release substrate permit an adhesive backed article to minimumly adhere to it, thereby serving as a temporary support. On the other hand, the substrate must also release the adhesive backed article with a minimum of effort, and not transfer the silicone coating to the adhesive (called migration), thereby preventing it from adhering to the final substrate. Silicone coated release substrates are most frequently produced by coating the substrate with a solvent or solventless based silicone resin composition. As the silicone resin composition dries, it adheres to the substrate.

U.S. Pat. No. 4,851,166 to Kendall discloses a polyester film which has been in-line coated with a heat curable, non-aqueous silicone resin composition prior to the stretch orientation stage. Kendall employs a solventless silicone resin system. Employing a solventless silicone resin system has economic disadvantages compared with solvent or aqueous based silicone resin systems. The chief difference is that solvent and aqueous based systems can be applied much thinner than a solventless system. Thus, the generally thicker coating of a solventless resin system is more expensive.

Canadian patent 1,120,176 to Kockemeyer discloses an aqueous based silicone resin system which can be coated upon plastic foil substrates for release film applications (referred to in this patent as adhesive repellent coatings). The coating composition is an aqueous emulsion consisting of: 1) diorganopolysiloxanes having silicon bonded vinyl groups in their terminal units; 2) from 20 to 50% by weight of organopolysiloxanes having at least three silicon bonded hydrogen atoms per molecule based upon the weight of the diorganopolysiloxane; and 3) a catalytic amount of platinum catalyst which promotes the addition of silicon bonded hydrogen to vinyl groups.

U.S. Pat. No. 3,427,270 to Northrup discloses a non-aqueous (i.e. solvent based) silicone resin composition useful as a release agent and adhesion promoting silanes. The non-aqueous silicone resin composition states that two silane ingredients are necessary for adequate adhesion of the silicone coating on a cellulosic substrate. The two components consist of an epoxysilane and an alkylsilane which is monovalent hydrocarbon radical having no more than three carbon atoms. As disclosed by this reference, the epoxysilanes by themselves do not give reproducible results when employed as adhesion promoters for silicone release agents. To overcome this problem, a second component of alkylsilane is needed.

European patent application 92117236.7 filed Oct. 9, 1992 to Farrar discloses a coating composition comprising an aqueous based silicone resin composition and at least 1% by weight of a glycidoxy silane. The aqueous based silicone resin composition comprises a methylvinyl polysiloxane containing terminal and pendant vinyl groups and a platinum catalyst as a crosslinker. The coating composition may be applied either by in-line or off-line coating on the corona-treated surface of the polyester film. The coating provides excellent ruboff resistance, protection against migration and good release properties.

The silicone coatings known in the art are very susceptible the swelling and dissolving in solvents. Therefore, there continues to be a need in the art for a silicone release coating system which is compatible with polymeric substrates, particularly polyester substrates, and provides excellent chemical resistance. The release coating applied on the substrate should not react with solvents. Specifically, it is desired to improve the known silicone release coatings with respect to swelling and dissolving in solvents, like for example in toluene. Such an improved chemical resistant coating is desired in order to avoid problems with solvent residues in adhesives, inks and paint removers that may be applied on the coating. Furthermore, new applications that have not been possible due to the lack of solvent resistance will be possible. Said improvement of the chemical resistance of the coating should at the same time not impair its desired rub-off resistance, good release properties and low migration.

SUMMARY OF THE INVENTION

The present invention provides a silicone coating composition capable of being applied to polyester film, which yields greatly improved chemical resistance and also is excellent in silicone release applications, due to excellent rub-off resistance, good release properties and low migration.

The present invention relates to a polyester release film comprising a polyester film having a coating on at least one surface thereof in an amount sufficient to act as a silicone coated release film, said coating composition comprising:

an alkylvinylpolysiloxane containing vinyl groups and a catalyst selected from the group consisting of a platinum complex or tin catalyst complex a glycidoxysilane an alkylhydrogenpolysiloxane.

DESCRIPTION OF THE PREFERRED EMBODIMENTS OF THE INVENTION

The polyester film of the present invention can be manufactured from various polyester resins. Polyethylene terephthalate, polytetramethylene terephthalate, polyethylene 2, 6-naphthalate, and polyethylene-1,4-cyclohexylene dimethylene terephthalate are examples of suitable homopolymers which may be employed in the practice of the present invention. Polyester copolymers may also be used. Possible copolyesters include polyethylene terephthalate/isophthalate, polyethylene terephthalate/ adipate, polyethylene terephthalate/sebacate, and polyethylene terephthalate/sulphoisophthalate. Polyethylene terephthalate homopolyester is preferred.

The polyester film may also include other polymers so long as the film has a polyester content greater than about 85% by weight. For example, a blend of polyester and polyolefin, such as polyethylene terephthalate/polyethylene, or a blend of polyester and polyamide, such as polyethylene terephthalate and nylon would be suitable.

The polyester film of the present invention can be manufactured by an extrusion process. Polyester resin is first heated to a molten state and then extruded through a wide slot die in the form of an amorphous sheet. The sheet-like extrudate is rapidly cooled to form a cast sheet of polyester by extruding the amorphous sheet around a polished, revolving chilled casting drum. The cast polyester sheet can then be stretched in at least one direction, while being heated to a temperature in the range of from about 80° C. to 160° C., preferably 90° C. to 100° C. The degree of stretching may range from about three to five times the original cast sheet unit dimension, preferably about three to four times the original cast sheet dimension. Preferably, the polyester film is biaxially oriented rather than uniaxially oriented.

Prior to coating the polyester film surface with the aqueous coating composition of the present invention, the film may be surface-treated in a conventional manner by exposure of the surface to a corona discharge. Corona discharge is a conventional surface treatment which is performed on polyester films to enhance the film's wetting property. Corona discharge methods and apparatus are described in U.S. Pat. Nos. 3,057,792 and 4,239,973.

For uniaxially oriented film, the corona treatment followed by the coating application may occur during the in-line manufacturing process, either before stretch orientation or after stretch orientation. If the corona treatment followed by the coating occurs before stretch orientation, heating the film before stretch orientation will usually drive off the water in the coating. If the corona treatment and coating for uniaxially oriented film occurs after the stretch orientation during the in-line manufacturing process, it is necessary to completely dry the film before winding the film. Heat-setting the film to lock-in the physical properties also is generally sufficient to dry the film before winding. For uniaxially oriented film, the preferred procedure is to corona treat and coat the film before stretch orientation.

For biaxially oriented film, the corona treatment followed by the coating may occur during the in-line manufacturing process either before stretch orientation, or between the machine draw and the transverse draw of biaxial stretch orientation, or after stretch orientation. Again, if the corona treatment and coating step occur after stretch orientation is complete, it is preferred that the film be completely dry before winding. Moreover, the biaxially oriented film must be heat set to lock-in the physical properties and this is generally sufficient to dry the film before winding. If the corona treatment or coating occurs before orientation, or between draws during orientation, the latter orientation steps are generally sufficient to drive off the water from the coating. Preferably, for biaxially oriented film the corona treatment and subsequent coating occur between draws during the stretch orientation stage.

The polyester sheet is coated on the corona treated surface with the coating composition of the present invention that will be described below in detail. The coating composition may conveniently be applied as an aqueous emulsion or dispersion. For example, the film may be coated by roller coating, spray coating, gravure coating, reverse gravure coating, or slot coating. The heat applied to the film during the subsequent preheating, stretching and/or heat-setting stages is generally sufficient to evaporate the water and cure and bind the coating to the polyester film.

The oriented polyester film is generally heat-set at a temperature ranging from 190° C. to 240° C., preferably from 215° C. to 235° C. The coated oriented polyester film is then wound into a roll for further processing or shipping.

The silicone release coating composition is generally prepared as follows: first by hydrolyzing the glycidoxy silane in deionized water. Then, the dialkylpolysiloxane containing pendant and terminal vinyl groups (hereinafter referred to as alkylvinylpolysiloxane) including the appropriate catalyst, platinum or tin, and the alkylhydrogenpolysiloxane are premixed in water resulting in an aqueous silicone resin emulsion. The prehydrolized glycidoxysilane and the aqueous silicone resin emulsion are intimately mixed to give the aqueous based coating composition.

Generally the silicone release coating compositions contain platinum as a catalyst. However, if condensation type alkylvinylpolysiloxanes are employed, then the emulsion can be catalyzed with a tin catalyst.

The alkylvinylpolysiloxane containing terminal and pendant vinyl groups is represented by the Formula I:

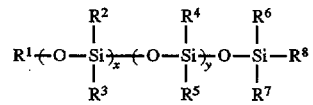

wherein $R^1$, $R^2$, $R^3$, $R^5$, $R^6$ and $R^7$ are the same or different and are alkyl groups with one to four C-atoms, preferably methyl-groups and wherein $R^4$ and $R^8$ are the same or different and are alkenyl groups with two to four C-atoms, preferably —CH=CH$_2$ groups or $R^8$ alternatively can be an alkyl group with one to four C-atoms, preferably a methyl group and wherein x is a number at least 1000 and y is 1–5.

Most preferred for the purpose of the invention are methylvinylpolysiloxanes. Generally, the vinyl-content of the alkylvinylpolysiloxane according to Formula I is between about 0.2 and about 10 mol % including pendant ($R^4$) and terminal ($R^8$) vinyl groups. Preferably said vinyl-content is about 0.2 to about 0.8 mol % of the total composition.

Such alkylvinylpolysiloxanes are commercially available, for example from Wacker Silicone (Adrian, Mich.), Dow Corning (Midland, Mich.), Rhone Poulenc, Inc. (Rockwell, S.C.).

The glycidoxy silane may be a gamma-glycidoxypropyltrimethoxysilane or generally any glycidoxysilane represented by the formula X—Y—Si— $R^{12}$, $R^{13}$, $R^{14}$, wherein X is a glycidoxy group, Y is an alkylene group, such as methylene, ethylene, propylene, etc., $R^{12}$, $R^{13}$ and $R^{14}$ are hydrolyzable groups, such as methoxy, ethoxy, acetoxy, and the like.

These glycidoxy silanes are water soluble or water dispersible and reactive with water.

The alkylhydrogenpolysiloxane is represented by the Formula II:

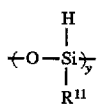

wherein $R^{11}$ is H or an alkyl group with one to four C-atoms, preferably a methyl group and y is a number between 20 and 25.

In order to achieve the improved chemical resistance of the coating, the alkylhydrogenpolysiloxane should contain at least about 0.7 mol % hydrogen, preferably about 0.7 to 3 mol %, more preferred 1.5 to 2 mol %.

It was surprisingly found that the hydrogen content of the crosslinker of at least 0.7 mol % significantly improves the solvent resistance of the silicone release coating. If the hydrogen content would be below 0.7 mol % the silicone coating will react with solvent residues and the release properties will be impaired.

It was also found that in addition to a high hydrogen content of the crosslinker, a high molar ratio of the hydrogen content in the crosslinker to the vinyl content in the alkylvinylpolysiloxane can improve the solvent resistance of the coating. After choosing a crosslinker according to the invention, the alkylvinylpolysiloxane is such that a higher ratio of hydrogen to vinyl in the coating composition will be achieved. It was found that for a given crosslinker the solvent resistance of the release coating will be further improved, when by variation of the alkylvinylpolysiloxane a higher hydrogen to vinyl ratio is achieved. With a given alkylvinylpolysiloxane it was found that the solvent resistance was better when hydrogen to vinyl ratio was higher, by varying the hydrogen content of the crosslinker.

The amount of deionized water blended with the components of silicone resin composition is dependent upon the coating method and the desired amount of solids, to be coated on the polyester film.

The solids level of the aqueous coating composition may be from about 3% to about 30% by weight solids based on the weight of the aqueous composition. Preferably, it is from about 5% to about 15% by weight. While it may be possible that a solids concentration below 3% by weight for the coating may be effective, it is believed that such a level would be minimally effective. Additionally, while a solids level greater than 30% by weight may be effective, it is believed that at such a level, a haze may result in the film, or the coating is more expensive but no more effective than a film having a solids level in the preferred range, for example.

The solids content in the aqueous coating composition includes all components (alkyvinylpolysiloxane, glycidoxy silane and alkylhydrogenpolysiloxane) described herein before. Their particular amounts are given below.

The preferred amount of the alkylvinylpolysiloxane containing vinyl groups is about 90 to about 95% by weight, based on the weight of the solids. With the above given solids content in the coating composition a content of about 10 to about 15% by weight, based on the weight of the aqueous coating composition of said siloxane will result.

The amount of the glycidoxy silane is at least 0.5% by weight, preferably 0.5–30% by weight, based on the weight of the solids. Using much more than about 30% by weight of the glycidoxy silane is expensive and may not yield results beyond expected results. For the preferred solid content range 0.5–15% by weight (based on the aqueous composition), a glycidoxy silane concentration in the aqueous coating composition of about 0.5% to about 1.5% by weight based on the weight of the aqueous composition results.

The amount of the alkylhydrogenpolysiloxane is generally about 3 to about 5% by weight, preferably 7 to 4% by weight based on the weight of solids. As already explained herein before it may be advantageous to adopt the amount of the crosslinker to the amount of the alkylvinylpolysiloxane such that preferably a higher molar ratio of hydrogen to vinyl in the coating composition will result. Said ratio should be preferably at least 3, more preferred at least 4.

The platinum or tin catalyst will be added in catalytic amounts sufficient, i.e., at least 0.5 ppm, to catalyze the addition of the hydrogen of the crosslinker to the vinyl bonds of the alkylvinylpolysiloxane.

The thickness of the coating is about 1000 Angstroms and is measured in a weight per area from 0.06 lb./1,000 sq. ft. to 0.25 lb./1,000 sq. ft. Generally a thickness less than the above amount is not effective as a release coating, while a thickness more than the above amount is not cost effective.

The invention will now be explained in further detail by the examples given below.

GENERAL EXPERIMENTAL CONDITIONS

1. General

Hostaphan 2000 type polyester films produced by Hoechst Diafoil Company were in-line coated during the manufacture with 11 different aqueous based silicone release coating compositions, including compositions according to the invention and comparative examples. The components of the compositions and their respective amounts are given below. The process for the film production was the same for every coating composition and was as follows:

2. Film Production

A PET type polyester was heated to a molten state and extruded through a slot dye onto a cooled casting drum to form an amorphous polyester film sheet. The amorphous polyester sheet was heated and stretched lengthwise (in machine direction). Thereafter one surface of the uniaxially oriented sheet was corona treated. The aqueous based coating composition was applied on the corona treated surface by reverse gravure application. Thereafter the film was heated again and stretched in the transverse direction. Finally the biaxially oriented film was heatset and wound up. The temperature and stretch conditions were as follows:

| | |
|---|---|
| Temperature for Stretching Lengthwise | 78° C. |
| Degree of Stretching Lengthwise | 3.5 |
| Corona Treatment | 0.5–1.5 watts/ |
| Temperature for Stretching Crosswise | 100° C. |
| Degree of Stretching Crosswise | 3.5–4.0 |
| Heatsetting Temperature | 225 ± 5° C. |
| Film Thickness | 36 microns |

3. Coating Composition

Eleven different coating compositions including examples according to the invention and comparative examples were applied on the corona treated surface of PET film prepared according to the process described above. In the coating compositions, three different alkylvinylpolysiloxanes were combined with three different kinds of alkylhydrogenpolysiloxanes. The glycidoxy silane is gamma glycidoxypropyltrimethoxysilane. The structure of this is:

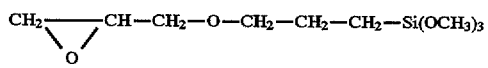

Additionally, the amount of alkylvinylpolysiloxane and alkylhydrogenpolysiloxane were varied. One series of coating compositions had a weight ratio of alkylvinylpolysiloxane to alkylhydrogenpolysiloxane of 39:1 and for the second series said ratio was 24:1. The amounts of all components of the coating compositions are given in Table 1a and 1b below.

TABLE 1a

Coating composition having a weight ratio of alkylvinylpolysiloxane to alkylhydrogenpolysiloxane of 39:1 for runs 1, 3, 7:

|  | Coating Composition | Water | Dry Solids | Alkylvinyl-polysiloxane | Alkylhydrogen-polysiloxane | Glycidoxy-silane |
|---|---|---|---|---|---|---|
| Absolute Amounts | 1500 g | 1290 g | 210 g | 196.6 g | 5.0 g | 8.4 g |
| % by weight based on the composition | 100% | 86% | 14% | 13.1% | 0.34% | 0.56% |
| % by weight based on solids weight % |  |  | 100% | 93.6% | 2.4% | 4% |

TABLE 1b

Coating composition having a weight ratio of alkylvinylpolysiloxane to alkylhydrogenpolysiloxane of 24:1 for runs 2, 4–6 and 8–11.

|  | Coating Composition | Water | Dry Solids | Alkylvinyl-polysiloxane | Alkylhydrogen-polysiloxane | Glycidoxy-silane |
|---|---|---|---|---|---|---|
| Absolute Amounts | 1500 g | 1290 g | 210 g | 193.5 g | 8.1 g | 8.4 g |
| % by weight based on the composition | 100% | 86% | 14% | 12.9% | 0.54% | 0.56% |
| % by weight based on solids weight % |  |  | 100% | 92.2% | 3.8% | 4% |

The following alkylvinylpolysiloxanes were used:
A is a methylvinylpolysiloxane with 0.425 mol % vinyl groups.
B is a methylvinylpolysiloxane with 0.67 mol % vinyl groups.
C is a methylvinylpolysiloxane with 0.29 mol % vinyl groups.

The following alkylhydrogenpolysiloxanes were used as crosslinkers.
V90 is a methylhydrogenpolysiloxane having 1.125 mol % hydrogen.
V20 is a methylhydrogenpolysiloxane having 0.73 mol % hydrogen.
X38 is a methylhydrogenpolysiloxane having 1.61 mol % hydrogen.

The composition of the different coating compositions for all runs are given below in Table 2. The table also includes the resulting molar ratio of hydrogen to vinyl for each composition.

TABLE 2

COATING COMPOSITION

| SAMPLE NUMBER | SILOXANE KIND | CROSSLINKER KIND | MOLAR RATIO | WEIGHT RATIO |
|---|---|---|---|---|
| 1 | A | V20 | 1.17 | 39:1 |
| 2 | C | V20 | 1.21 | 24:1 |
| 3 | A | V90 | 1.83 | 39:1 |
| 4 | C | V90 | 1.89 | 24:1 |
| 5 | A | V20 | 1.91 | 24:1 |
| 6 | A | V20 | 1.91 | 24:1 |
| 7 | A | X38 | 2.62 | 39:1 |
| 8 | B | V20 | 2.80 | 24:1 |
| 9 | A | V90 | 2.98 | 24:1 |
| 10 | A | X38 | 4.27 | 24:1 |
| 11 | B | X38 | 6.27 | 24:1 |

4. Film Testing

Three different kinds of tests were run to determine the solvent resistance of the release coating towards different solvents. Basically, all tests measure the change in release either after wiping the silicone coating with the solvents or after aging the coated film at a certain temperature.

4.1 One Day Tesa Test

A Tesa 7475 acrylic tape of one inch width was applied to the unwiped silicone release coating of each film sample. After one day (24 hours) samples of 1 inch width were cut and the tape was peeled at an angle of 180° with a speed of 12 inches per minute. The force to peel the tape off was measured in grams/inch. Generally acceptable release values are low force values, preferably less than 100 grams/inch. The release values for the untreated surface (no solvent) in the Table 3 below.

TABLE 3

| Sample Number | No Solvent | Oven Aged | Toluene | MEK | IPA | Heptane |
|---|---|---|---|---|---|---|
| 1 | 13 | 17 | 833 | 847 | 323 | 77 |
| 2 | 36 | 48 | 1000 | 467 | 1000 | 1000 |
| 3 | 14 | 21 | 100 | 15 | 83 | 217 |
| 4 | 118 | 34 | 387 | 210 | 657 | 217 |
| 5 | 16 | 38 | 480 | 813 | 440 | 683 |
| 6 | 17 | 47 | 553 | 470 | 967 | 703 |
| 7 | 15 | 24 | 57 | 230 | 88 | 43 |
| 8 | 17 | 33 | 353 | 457 | 333 | 360 |
| 9 | 38 | 51 | 430 | 547 | 767 | 157 |
| 10 | 17 | 170 | 68 | 153 | 47 | 80 |
| 11 | 23 | 162 | 50 | 22 | 47 | 23 |

The silicone release coating of each sample was wiped with toluene, methylethylketone (MEK), isopropyl alcohol (IPA), and heptane. Thereafter the same one inch wide Tesa 7475 was applied in the same manner to the wiped surfaces of each sample. After one day samples of 1 inch width were cut and the tape was also peeled at an angle of 180° with a speed of 12 inches per minute and the measured forces necessary to peel the tape gave the release values for the solvent treated silicone release coating.

In addition, the release coatings were evaluated for release change after oven aging at 140° F. For this test Tesa 7475 was applied to unwiped film samples exactly in the same manner as described above. Thereafter the samples were kept in an oven at 140° F. for 24 hours. Thereafter they were cooled down to room temperature. After one day inch wide samples were cut and peeled in exactly the same way as described above to determine the release value after heat aging (oven aged). The results for the "One Day Tesa Test" are given in Table 3.

4.2 One Week Tesa Test

These tests were performed exactly as described for the "One Day Tesa Test" except for the time the tapes remained on the samples. For these tests the tapes were peeled off one week after the tapes have been applied to the respective unwiped, oven aged and wiped surfaces. The results are given in Table 4.

TABLE 4

| Sample Numbers | No Solvent | Oven Aged | Toluene | MEK | IPA | Heptane |
|---|---|---|---|---|---|---|
| 1 | 12 | 10 | 543 | 933 | 383 | 223 |
| 2 | 21 | 22 | 1000 | 1000 | 1000 | 1000 |
| 3 | 10 | 18 | 312 | 383 | 250 | 185 |
| 4 | 105 | 21 | 1000 | 653 | 173 | 217 |
| 5 | 18 | 20 | 380 | 1000 | 457 | 687 |
| 6 | 19 | 26 | 587 | 750 | 507 | 190 |
| 7 | 12 | 21 | 140 | 237 | 200 | 107 |
| 8 | 18 | 22 | 550 | 750 | 507 | 190 |
| 9 | 23 | 42 | 290 | 450 | 78 | 203 |
| 10 | 19 | 167 | 92 | 160 | 287 | 28 |
| 11 | 23 | 182 | 140 | 197 | 37 | 47 |

4.3 Gelva Test

These tests were run to further test the release change after heat aging. For these tests the film samples were tested using Gelva 1753 tape, a solvent based acrylic adhesive tape. This solvent based adhesive tape is applied directly to the untreated silicone coated surface of the film samples. Then the samples were heated in an oven at 120° F. for one hour. The adhesive coated release film was then laminated with a biaxially oriented polypropylene film as a face stock. The film laminate was aged at room temperature (RT) and at 140° F. for one day, one week, and three weeks. One inch wide samples were cut and the Gelva tape was peeled at an angle of 180° at 12 inches per minute. Again the forces to peel the tape off gave the release values for each sample. The results are given in Table 5.

TABLE 5

| Sample Number | 1 Day at RT | 1 Week at RT | 3 Weeks at RT | 1 Day at 140° F. | 1 Week at 140° F. | 3 Weeks at 140° F. |
|---|---|---|---|---|---|---|
| 1 | 8 | 9 | 9 | 16 | 21 | 14 |
| 2 | 12 | 15 | 14 | 16 | 26 | 13 |
| 3 | 5 | 14 | 7 | 15 | 15 | 9 |
| 4 | 8 | 7 | 7 | 12 | 18 | 12 |
| 5 | 11 | 8 | 10 | 11 | 33 | 15 |
| 6 | 7 | 8 | 8 | 7 | 22 | 13 |
| 7 | 9 | 7 | 8 | 9 | 23 | 14 |
| 8 | 8 | 5 | 9 | 8 | 16 | 11 |
| 9 | 8 | 9 | 7 | 8 | 16 | 11 |
| 10 | 7 | 13 | 7 | 11 | 22 | 12 |
| 11 | 32 | 9 | 8 | 32 | 23 | 13 |

5. Results 5.1 One Day Tesa Test

In the case of untreated surfaces designated as no solvent, the release values for all samples 1 to 11 were all below or at most about 118 as shown in Table 3. After wiping the surface with the respective solvent (Toluene, MEK, IPA, and Heptane) the release value generally increased compared to the untreated surface. For a solvent resistant surface the release value should not raise significantly. A release value of 100 or less after treating the surface is considered acceptable but values of less than 70 are preferred.

The tables show that all samples containing V20 (see samples 1, 2, 5, 6, 8) as a crosslinker in the release coating have a significant increase in their release force after being solvent treated.

Samples 7, 10 and 11 have the best overall solvent resistance. Except for two tests with MEK (samples 7 and 10) the release forces remain low, that is under 100. But also the solvent resistance towards MEK is still good with a raise to values between 100 and about 200. These samples have a silicone release coating containing X38 (hydrogen content 1.61 mol %) as a crosslinker.

Some of V90 containing coatings (white pattern) show good solvent resistance. Specifically sample 3 turned out to be very resistant towards all solvents.

5.2 One Week Tesa Test

Table 4 shows the results for the One Week Tesa Test. After one week the release values for the untreated surfaces were about the same as they were after one day. On average all release values for the treated surfaces were somewhat higher. Again the highest increase is always observed for the samples with the V20 (samples 1, 2, 6, 6 & 8) containing coating and the lowest increase for the samples having the X38-containing coating.

V90 containing coating were specifically resistant towards IPA and Heptane. Again, sample 3 is the best of all V90 samples.

Heat aging did not cause a significant raise for any sample.

5.3 Gelva Test

The Gelva test confirmed the results of heat aging test with the Tesa Test. Generally, the release values are very low. The untreated surfaces (except for one) had release values between 5 and about 15. Heat aging did not cause a significant increase of the release values for any sample. The release values after heat aging ranged between about 15 and 30. Accordingly, all coatings were considered to be resistant towards heat treatment.

As shown above, coating compositions according to the invention are significantly improved with respect to their solvent resistance towards a variety of solvents. Surprisingly an alkylhydrogenpolysiloxane having a high hydrogen content caused an improved solvent resistance of the coating. Conventional crosslinkers with a comparable lower hydrogen content are shown to be not resistant to most solvents.

What is claimed is:

1. A polyester release film comprising an oriented polyester film and an effective amount of a silicone release coating composition on said film to release an adhesive backed article from the silicone coating, said silicone release coating comprising a) an alkylvinylpolysiloxane containing vinyl groups;

b) a catalyst selected from the group consisting of platinum complex and tin complex;

c) a glycidoxysilane; and d) an alkylhydrogenpolysiloxane containing 1.5 to 2 mol % hydrogen.

2. The polyester release film of claim 1, wherein said alkylvinylpolysiloxane is dimethylvinylpolysiloxane.

3. The polyester release film of claim 2 wherein said dimethylvinylpolysiloxane contains 0.2 to 10 mol % vinyl groups.

4. The polyester release film according to claim 1 wherein the glycidoxysiloxane is gamma-(glycidoxyproypl) trimethoxysilane.

5. The polyester release film according to claim 1 wherein said alkylhydrogenpolysiloxane is methylhydrogenpolysiloxane.

6. The polyester release film according to claim 1 wherein said silicone release coating composition comprises 3 to 30% by weight solids based on the weight of the coating composition.

7. The polyester release film according to claim 6, wherein said coating composition comprises at least 0.5% of glycidoxysilane by weight based on the weight of the solids of said coating composition.

8. A silicone release coating composition comprising:
a) an alkylvinylpolysiloxane containing vinyl groups;
b) a catalyst selected from the group consisting of platinum complex and tin complex;
c) a glycidoxysilane; and
d) an alkylhydrogenpolysiloxane containing 1.5 to 2 mol % hydrogen.

9. A polyester release film according to claim 1 wherein the silicone release coating composition comprises
a) an alkylvinylpolysiloxane of the formula

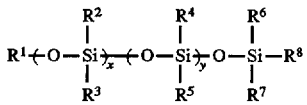

wherein
$R^1$, $R^2$, $R^3$, $R^5$, $R^6$ and $R^7$ are the same or different and are alkyl groups with one to four carbon atoms,
$R^4$ and $R^8$ are the same or different and are alkenyl groups with two to four carbon atoms or $R^8$ is an alkyl group with one to four carbon atoms,
x is a number at least 1000 and
y is 1–5;
b) a catalyst selected from the group consisting of platinum complex and tin complex;
c) a glycidoxysilane; and
d) an alkylhydrogenpolysiloxane represented by the formula

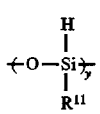

wherein
$R^{11}$ is an alkyl group with one to four carbon atoms and y is a number between 20 and 25.

10. A polyester release film according to claim 9 wherein the glycidoxysilane is a compound of the formula

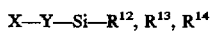

wherein Y is an alkylene group and $R^{12}$, $R^{13}$, and $R^{14}$ are hydrolyzable groups.

11. A polyester release film according to claim 10 wherein Y is methylene, ethylene or propylene and $R^{12}$, $R^{13}$, and $R^{14}$ are methoxy, ethoxy or acetoxy.

12. A polyester release film according to claim 11 wherein $R^4$ and $R^8$ are —CH=CH$_2$ groups.

13. A polyester release film according to claim 12 wherein $R^{11}$ is a methyl group.

14. A polyester release film according to claim 13 wherein the amount of alkylvinylpolysiloxane a) is about 90 to about 95%, the amount of glycidoxy silane c) is at least 0.5% and the amount of alkylhydrogenpolysiloxane d) is about 3 to about 5%, all by weight based on the weight of solids in the coating composition.

15. A polyester release film according to claim 9 wherein $R^4$ and $R^8$ are —CH=CH$_2$ groups.

16. A silicone release coating composition according to claim 8 which comprises
a) an alkylvinylpolysiloxane of the formula

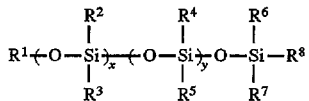

wherein
$R^1$, $R^2$, $R^3$, $R^5$, $R^6$ and $R^7$ are the same or different and are alkyl groups with one to four carbon atoms,
$R^4$ and $R^8$ are the same or different and are alkenyl groups with two to four carbon atoms or $R^8$ is an alkyl group with one to four carbon atoms,
x is a number at least 1000 and
y is 1–5;
b) a catalyst selected from the group consisting of platinum complex and tin complex;
c) a glycidoxysilane; and
d) an alkylhydrogenpolysiloxane represented by the formula

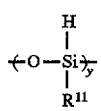

wherein
$R^{11}$ is an alkyl group with one to four carbon atoms and y is a number between 20 and 25.

17. A composition according to claim 9 wherein the glycidoxysilane is a compound of the formula

wherein Y is an alkylene group and $R^{12}$, $R^{13}$, and $R^{14}$ are hydrolyzable groups.

18. A composition according to claim 17 wherein Y is methylene, ethylene or propylene and $R^{12}$, $R^{13}$, and $R^{14}$ are methoxy, ethoxy or acetoxy.

19. A composition according to claim 18 wherein $R^4$ and $R^8$ are —CH=CH$_2$ groups.

20. A composition according to claim 19 wherein $R^{11}$ is a methyl group.

21. A polyester release film according to claim 20 wherein the amount of alkylvinylpolysiloxane a) is about 90 to about 95%, the amount of glycidoxy silane c) is at least 0.5% and the amount of alkylhydrogenpolysiloxane d) is about 3 to about 5%, all by weight based on the weight of solids in the coating composition.

22. A composition according to claim 16 wherein $R^4$ and $R^8$ are —CH=CH$_2$ groups.

* * * * *